(12) United States Patent
Ooga

(10) Patent No.: US 7,847,503 B2
(45) Date of Patent: Dec. 7, 2010

(54) CONTROL APPARATUS AND METHOD FOR CONTROLLING A CONTROL SUBJECT

(75) Inventor: Junichiro Ooga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 288 days.

(21) Appl. No.: 12/129,749

(22) Filed: May 30, 2008

(65) Prior Publication Data

US 2008/0297094 A1 Dec. 4, 2008

(30) Foreign Application Priority Data

May 31, 2007 (JP) ............................. 2007-144999

(51) Int. Cl.
G05B 19/04 (2006.01)
B25J 9/00 (2006.01)

(52) U.S. Cl. .............................. 318/568.11; 318/568.2; 700/245

(58) Field of Classification Search ................ 318/566, 318/567, 568.1, 568.11, 568.12, 568.2, 568.21, 318/573, 632; 901/1, 2, 8; 700/245, 250, 700/263

See application file for complete search history.

(56) References Cited

U.S. PATENT DOCUMENTS

| | | | | |
|---|---|---|---|---|
| 5,006,999 A * | 4/1991 | Kuno et al. | .................. | 700/253 |
| 5,373,747 A * | 12/1994 | Ogawa et al. | .......... | 73/862.581 |
| 5,994,864 A * | 11/1999 | Inoue et al. | ............... | 318/568.2 |
| 7,558,647 B2 * | 7/2009 | Okazaki | ..................... | 700/260 |
| 2008/0077279 A1 * | 3/2008 | Kato et al. | .................. | 700/261 |
| 2009/0105880 A1 * | 4/2009 | Okazaki | ..................... | 700/258 |
| 2010/0114371 A1 * | 5/2010 | Tsusaka et al. | ............. | 700/250 |

FOREIGN PATENT DOCUMENTS

| JP | H05-164648 | 6/1993 |
|---|---|---|
| JP | 2004-171333 | 6/2004 |

* cited by examiner

*Primary Examiner*—Walter Benson
*Assistant Examiner*—Eduardo Colon
(74) *Attorney, Agent, or Firm*—Turocy & Watson, LLP

(57) ABSTRACT

A control apparatus includes: a memory storing data regarding an interference matrix; a position compensation calculator calculating position compensation by using the data based on a target position of an output shaft and a detected position of the output shaft; a torque compensation calculator calculating torque compensation by using the data based on the detected position of the output shaft and a detected position of a drive shaft; and a command value calculation unit calculating a command value for the drive source based on the position compensation and the torque compensation.

19 Claims, 9 Drawing Sheets

CONTROL APPARATUS AND METHOD FOR CONTROLLING A CONTROL SUBJECT

CROSS REFERENCE TO RELATED APPLICATIONS AND INCORPORATED BY REFERENCE

The application is based upon and claims the benefit of priority from the prior Japanese Patent Applications No. P2007-144999, filed on May 31, 2007; the entire contents of which are incorporated herein by reference.

BACKGROUND OF THE INVENTION

1. Field of the Invention

The present invention relates to a control apparatus, a control method, program and a robot to be controlled so as to determine a target position for a control subject.

2. Description of the Related Art

A "full-close control" is a type of position control for moving a control subject, such as a robot, to a target position. This type of control is performed by measuring positions of both of a drive source for driving the control subject and the control subject. The full-closed control directly measures the position of the control target, and accordingly, has an advantage of enabling a highly precise positioning control. To the contrary, the full-closed control may possibly become unstable so that a control error occurs when means for transmitting a drive force between the drive source and the control target includes error factors, for example, such as drive motor backlash, shaft slippage, elongation of a wire or bending of a link.

As countermeasures against such control error caused by the error factors, the control system may conduct position compensation and drive torque compensation. For the position compensation, for example, a method is known that calculates the position compensation relating to the target position based on results of passing, through filtering means, outputs of the respective position detectors for the drive source and the control subject. In this case, it is assumed that a relationship expression (interference matrix) that represents a positional relationship between the drive source and the control subject is constant. Here, a link mechanism including a motor and a speed reducer is given as an example. In this link mechanism, the control is based on a value of an encoder attached to the motor and is transmitted through the speed reducer. Where a reduction ratio of the speed reducer is high, there is hardly an error, and the above-described relationship expression can be uniquely expressed by the matrix and the like. However, in the case of employing such drive force transmitting tool, such as a wire, when the control subject changes a posture and a load is applied thereto, the wire is elongated, and the respective matrix elements assumed in the interference matrix are changed. Moreover, in the case of employing an interference mechanism (coupling mechanism), there is a tendency for the matrix elements to be changed more significantly, and in addition, the matrix elements will be nonlinear elements. Accordingly, it is difficult to determine the positional relationship (the relational expression) by using an accurate model. It is difficult to eliminate nonlinear variations of the positional relationship with the filtering means.

When performing such position compensation as described above by using a target position deviation, an integral element is introduced into a position control system, whereby a stationary deviation is eliminated, thus making it possible to improve control performance. However, in general, the integral element causes a phase delay, which causes control instability.

As for drive torque compensation, a control system has been developed in which tension applied to the wire is directly measured by a tension differential type torque sensor, and a feedback control is performed. However, the tension differential type torque sensor directly contacts the drive force transmitting tool, and accordingly, rigidity of the drive force transmitting tool itself is decreased. As described above, it is difficult to stably perform the target position following control.

SUMMARY OF THE INVENTION

An object of the present invention is to provide a control apparatus, a control method, a program and a robot which can stably perform target position following control.

An aspect of the present invention inheres in a control apparatus for controlling a control subject including a drive shaft, an output shaft, a drive source for driving the drive shaft, and a drive force transmitting tool for transmitting a drive force from the drive shaft to the output shaft, including: a memory configured to store data regarding an interference matrix representing a relationship between a position of the output shaft and a position of the drive shaft; a position compensation calculator configured to calculate position compensation for the drive shaft by using the data based on a target position of the output shaft and a detected position of the output shaft; a torque compensation calculator configured to calculate torque compensation for the drive shaft by using the data based on the detected position of the output shaft and a detected position of the drive shaft; a command value calculation unit configured to calculate a command value based on the position compensation and the torque compensation; and an output unit configured to output a signal to the drive source based on the command value.

Another aspect of the present invention inheres in a control method for controlling a control subject including a drive shaft, a output shaft, a drive source for driving the drive shaft, and a drive force transmitting tool for transmitting a drive force from the drive shaft to the output shaft, including: calculating position compensation for the drive shaft using data regarding an interference matrix representing a relationship between a position of the output shaft and a position of the drive shaft, based on a target position of the output shaft and a detected position of the output shaft; calculating a torque compensation for the drive shaft using the data based on the detected position of the output shaft and a detected position of the drive shaft; calculating a command value based on the position compensation and the torque compensation; and outputting a signal to the drive source based on the command value.

Further aspect of the present invention inheres in a program provided in a computer readable format configured to be executed by a computer for executing an application on a control apparatus for controlling a control subject including a drive shaft, output shaft, a drive source for driving the drive shaft, and a drive force transmitting tool for transmitting drive force from the drive shaft to the output shaft, including: instructions for calculating position compensation for the drive shaft using data regarding an interference matrix representing a relationship between a position of the output shaft and a position of the drive shaft, based on a target position of the output shaft and a detected position of the output shaft; instructions for calculating a torque compensation for the drive shaft using the data based on the detected position of the output shaft and a detected position of the drive shaft; instructions for calculating a command value to be transmitted the drive source based on the position compensation and the torque compensation; and instructions for outputting a signal to drive the drive shaft based on the command value.

Further aspect of the present invention inheres in a robot including: a drive shaft; an output shaft; a drive source configured to drive the drive shaft; and a drive force transmitting tool configured to transmit a drive force from the drive shaft to the output shaft; a drive shaft position detector configured to detect a position of the drive shaft; an output shaft position detector configured to detect a position of the output shaft; a control apparatus including: a memory configured to store data regarding an interference matrix representing a relationship between a position of the output shaft and a position of the drive shaft; a position compensation calculator configured to calculate position compensation for the drive shaft by using the data based on a target position of the output shaft and a detected position of the output shaft; a torque compensation calculator configured to calculate torque compensation for the drive shaft by using the data based on the detected position of the output shaft and a detected position of the drive shaft; a command value calculation unit configured to calculate a command value based on the position compensation and the torque compensation; and an output unit configured to output a signal based on the command value; and, a drive source configured to drive the drive shaft based on the signal.

DETAILED DESCRIPTION OF THE INVENTION

Figure 1:
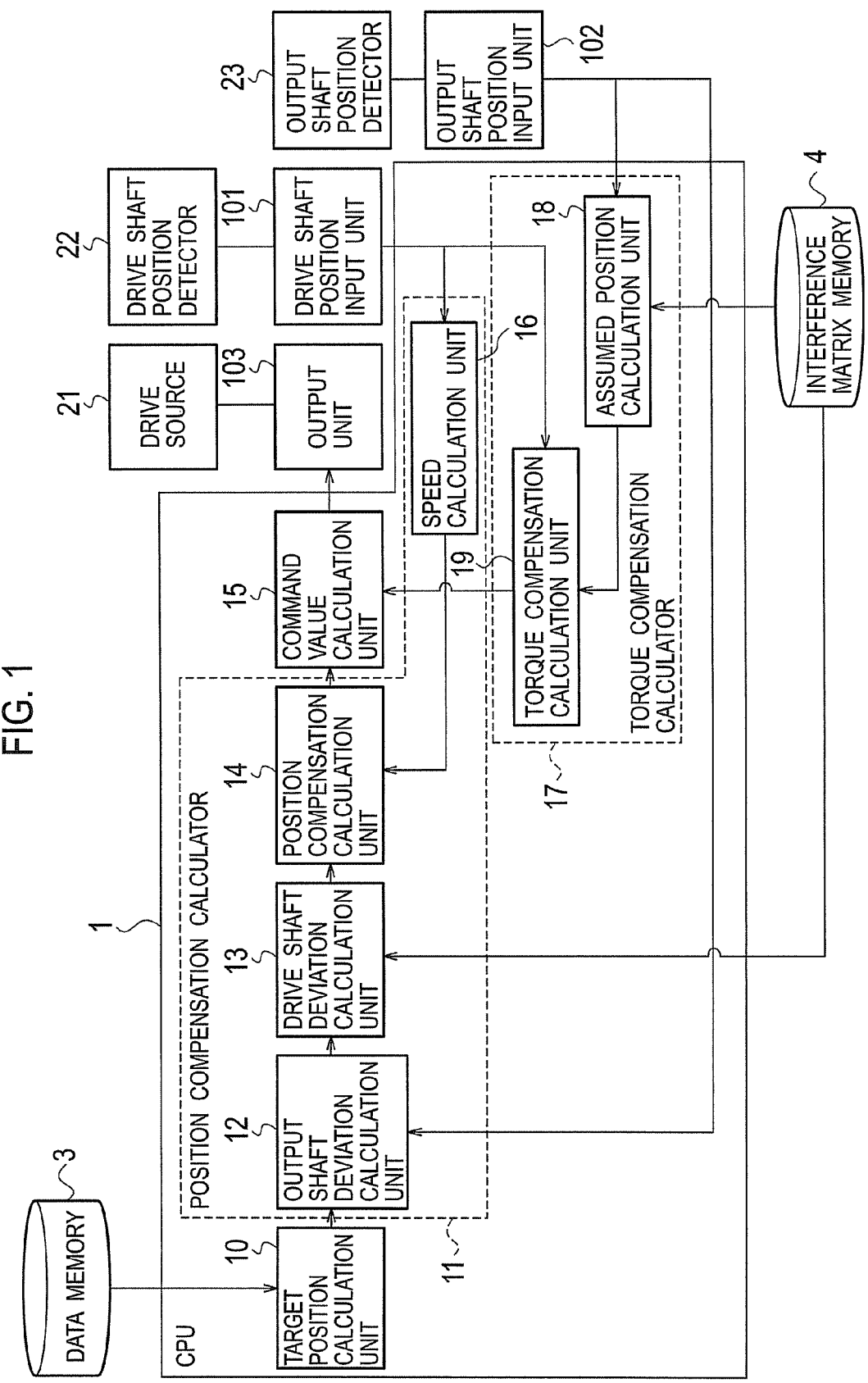
FIG. 1 is a block diagram showing an example of a control apparatus according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

A control apparatus according to the embodiment of the present invention controls a control subject (robot) including a drive shaft, an output shaft, and a drive force transmitting tool that couples the drive shaft and the output shaft to each other. As shown in FIG. 1, the control apparatus includes: a position compensation calculator 11 for calculating position compensation for a target position of the output shaft and a detected position of the output shaft by using a relational expression (interference matrix) that represents a relationship between the position of the output shaft and a position of the drive shaft; a torque compensation calculator 17 for calculating torque compensation for the drive shaft based on the detected position of the output shaft and a detected position of the drive shaft by using the interference matrix; a command value calculation unit 15 that calculates a command value to a drive source 21, to be described later, based on the position compensation and the toque compensation for the drive shaft; and the drive source 21 controlled by an output signal from an output unit 103, which is based on the command value. The drive source 21 drives (rotates) the drive shaft.

Figure 2:
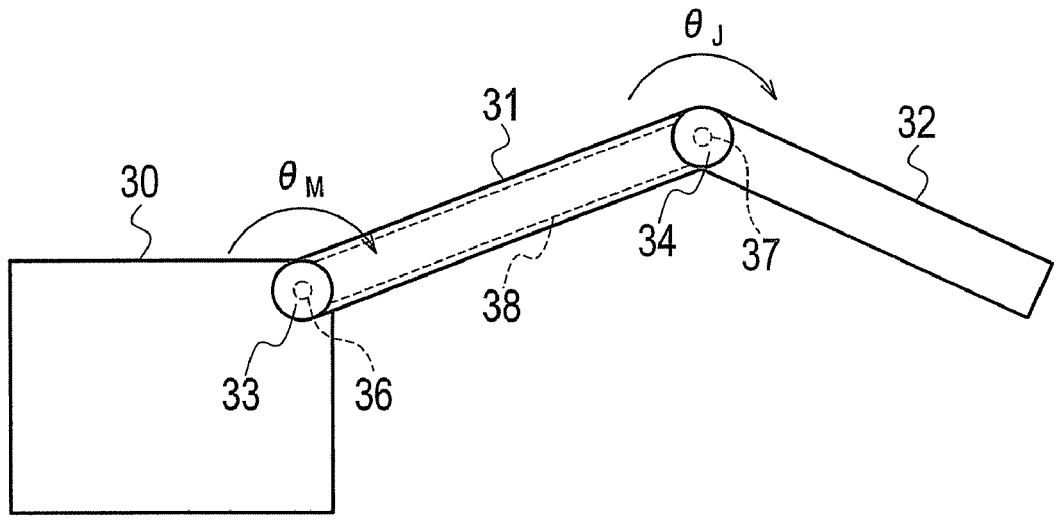
FIG. 2 is a schematic view showing an example of a control subject according to the embodiment of the present invention.

As schematically shown in FIG. 2, the control subject in the embodiment of the present invention includes a main body 30 and a movable unit connected to the main body 30. The movable unit includes: a plurality of links 31 and 32; a plurality of joints 36 and 37 including a drive pulley 33, a driven pulley 34, and the like; and the drive force transmitting tool (wire/belt) 38 for transmitting drive force from the drive pulley 33 to the driven pulley 34. The drive force transmitting tool 38 is wound around the drive pulley 33 and the driven pulley 34.

Figure 3:
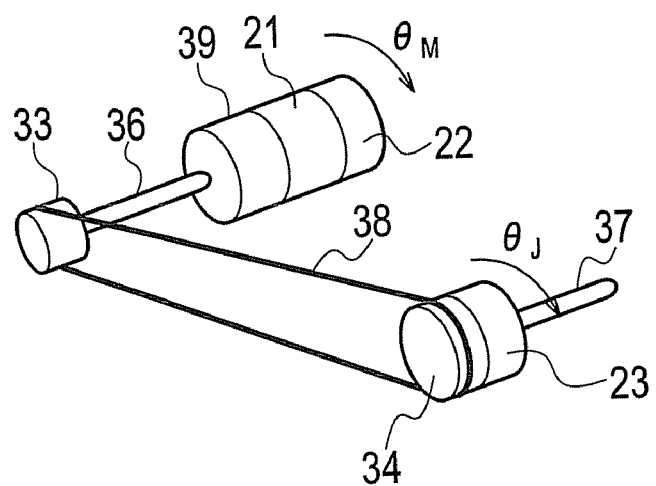
FIG. 3 is a perspective view showing an example of a part of the control subject according to the embodiment of the present invention.

As schematically shown in FIG. 3, the drive pulley 33, a speed reducer 39, the drive source 21 and a drive shaft position detector 22 are attached to the drive shaft (joint) 36 with a drive shaft position input unit 101 interposed therebetween. For the drive source 21, an actuator such as a servo motor is usable. The drive source 21 provides a rotational drive input, and the speed reducer 39 reduces the number of revolutions generated by the drive source 21, and increases the rotation torque. The driven pulley 34 and an output shaft position detector 23 are attached to the output shaft (joint) 37 with an output shaft position input unit 102 interposed therebetween. By rotating of the drive shaft 36, the output shaft 37 is rotatably driven by the drive pulley 33, the drive force transmitting tool (wire/belt) 38 and the driven pulley 34. In the embodiment of the present invention, for simplification, a description will be made of the case of controlling the drive shaft 36 and the output shaft 37.

For each of the drive shaft position detector 22 and the output shaft position detector 23, a position sensor such as a rotary encoder may be used. The position sensor may include a filter that removes a predetermined frequency component. The drive shaft position detector 22 detects an angular displacement (of a drive shaft angle) $\Theta_M$ of a position (rotation) of the drive shaft 36. The output shaft position detector 23 detects an angular displacement (of an output shaft angle) $\Theta_J$ of a position (rotation) of the output shaft 37.

For each of a data memory 3 and an interference matrix memory 4, shown in FIG. 1, for example, a semiconductor memory, a magnetic disk, an optical disk, a magneto-optical disk, a magnetic tape or the like may be used. The data memory 3 stores a data string relating to the target position. The interference matrix memory 4 stores an output shaft-drive shaft displacement transformation (hereinafter, simply referred to as the "interference matrix") $^M T_J$ of a reference posture. The interference matrix $^M T_J$ can be represented as in Expression (1) by using the displacement $\Theta_M$ of the position of the drive shaft 36 and the displacement $\Theta_J$ of the position of the output shaft 37.

$$\Theta_J = {^M}T_J \Theta_M \tag{1}$$

A target position calculation unit 10, the position compensation calculator 11, the torque compensation calculator 17 and the command value calculation unit 15 are incorporated as a module in a central processing unit (CPU) 1. The target position calculation unit 10 reads out the data string from the data memory 3, and calculates a target position $\Theta_{Jr}$ of the output shaft 37 in each control cycle.

The position compensation calculator 11 includes: a first deviation calculation unit (an output shaft deviation calculation unit) 12; a second deviation calculation unit (a drive shaft deviation calculation unit) 13; a speed calculation unit 16; and a position compensation calculation unit 14. The first deviation calculation unit 12 calculates a first angular deviation $\Delta\Theta_J (= \Theta_J - \Theta_{Jr})$ between the displacement $\Theta_J$ of such a rotational position of the output shaft 37, which is detected by the output shaft position detector 23 and inputted by the output shaft position input unit 102, and the target position $\Theta_{Jr}$ of the output shaft 37, which is calculated by the target position calculation unit 10.

The second deviation calculation unit 13 converts the first deviation $\Delta\Theta_J$, which is calculated by the first deviation calculation unit 12, by using the interference matrix $^M T_J$, and calculates a second deviation $\Delta\Theta_M$ as in Expression (2).

$$\Delta\Theta_M = {^M}T_J \Delta\Theta_J \tag{2}$$

The speed calculation unit 16 calculates the speed (angular velocity) of the drive shaft 36 based on the displacement $\Theta_M$ of the position of the drive shaft 36, which is detected by the drive shaft position detector 22 and inputted by the drive shaft position input unit 101. Note that, though the speed calculation unit 16 can also calculate the speed of the drive shaft 36 based on the displacement $\Theta_J$ of the position of the output shaft 37, the drive shaft 36 and the output shaft 37 differ in speed from each other by a reduction ratio. Hence, if the drive shaft position detector 22 and the output shaft position detector 23 have the same resolution power, then it is preferable that the speed of the drive shaft 36 be calculated based on the displacement $\Theta_M$ of the position of the drive shaft 36 rather than based on the displacement $\Theta_J$ of the position of the output shaft 37 since the speed of the drive shaft 36 can be calculated with higher accuracy.

The position compensation calculation unit 14 calculates position compensation of the drive shaft 36 based on the second angular deviation $\Delta\Theta_M$ calculated by the second deviation calculation unit 13 and on the speed of the drive shaft 36 calculated by the speed calculation unit 16, and defines the calculated position compensation of the drive shaft 36 as position compensation of the output shaft 37. As described above, in a speed control loop in which there is a feedback of the speed of the drive shaft 36, a position control loop in which the second deviation $\Delta\Theta_M$ is a feedback can be constructed. When an integral element is implemented in the position control loop, a stationary deviation from the command value can be eliminated. However, the implementation of the integral element causes a phase delay, and a not so large gain cannot be given.

The torque compensation calculator 17 includes an assumed position calculation unit 18 and a torque compensation calculation unit 19. The assumed position calculation unit 18 converts the displacement $\Theta_J$ of such a position of the output shaft 37, which is detected by the output shaft position detector 23, by using the interference matrix $^M T_J$ of the reference posture, thereby calculating an assumed position $\Theta'_M$ of the dive shaft 36 as in Expression (3).

$$\Theta'_M = {^M}T_J \Theta_J \tag{3}$$

Here, the interference matrix $^M T_J$ represents a certain posture (hereinafter, referred to as the "reference posture") of the robot, such as an initial posture at a predetermined time. The interference matrix $^M T_J$ is calculated in advance based on a geometrical structure of the robot at the time when no load is applied thereto from the outside. In the case where the robot changes posture from the reference posture, or in the case where a load is applied thereto from the outside, the drive force transmitting tool 38 (wire) is elongated, and the length of it's route is changed, whereby an error occurs in the drive force transmitting tool 38. In such a way, the interference matrix $^M T_J$ is varied, and sometimes converts to an interference matrix $^M T'_J$, different from the interference matrix $^M T_J$. The actual displacement $\Theta_M$ of the position of the drive shaft 36, which is detected by the drive shaft position detector 22, is represented as in Expression (4) by using the interference matrix $^M T'_J$.

$$\Theta_M = {^M}T'_J \Theta_J \tag{4}$$

Therefore, the displacement $\Theta_M$ of the position of the drive shaft 36, which is detected by the drive shaft position detector 22, and the assumed position $\Theta'_M$ of the drive shaft 36 calculated by the assumed position calculation unit 18 do not always coincide with each other. Sometimes a difference $\Delta\Theta_M (= \Theta'_M - \Theta_M)$ occurs, corresponding to a variation $\Delta {^M}T_J$ ($= {^M}T_J - {^M}T'_J$) from the interference matrix $^M T_J$ in the reference posture. The torque compensation calculation unit 19 calculates the difference $\Delta\Theta_M$ equivalent to the variation $\Delta {^M}T_J$ of the interference matrix as in Expression (5).

$$\Delta\Theta_M = \Delta\!{^M}T_J \Theta_J \tag{5}$$

The toque compensation calculation unit 19 calculates the torque compensation $\tau_M$ of the drive shaft 36 based on the difference $\Delta\Theta_M$. For example, in the case where the difference $\Delta\Theta_M$ is subjected to linear compensation, the torque compensation $\tau_M$ of the drive shaft 36 is calculated as in Expression (6) by using K as a coefficient.

$$\tau_M = K \Delta\Theta_M \tag{6}$$

Note that, besides being subjected to linear compensation, the difference $\Delta\Theta_M$ may be implemented by a torque observer, and so on.

The command value calculation unit 15 adds the torque compensation $\tau_M$ of the drive shaft 36 calculated by the toque compensation calculation unit 19 and the position compensation of the output shaft 37 calculated by the position compensation calculation unit 14 together, thereby calculating the command value.

The output unit 103 outputs the signal for driving the drive shaft 36 based on the command value calculated by the command value calculation unit 15. The drive source 21 drives the drive shaft 36 based on the signal from the output unit 103.

Next, a description will be made of a control method according to the embodiment of the present invention while referring to a flowchart of FIG. 4.

In Step S1, the target position calculation unit 10 reads out a target position data string from the data memory 3, and calculates the target position $\Theta_{Jr}$ of the output shaft 37 in each control cycle.

In Step S2, the position compensation of the output shaft 37 is calculated based on the displacement $\Theta_J$ of the position of the output shaft 37, which is detected by the output shaft position detector 23, and on the target position $\Theta_{Jr}$ calculated by the target position calculation unit 10.

In Step S3, the torque compensation $\tau_M$ of the drive shaft 36 is calculated based on the displacement $\Theta_J$ of the position of the output shaft 37, which is detected by the output shaft position detector 23, and on the displacement $\Theta_M$ of the position of the drive shaft 36, which is detected by the drive shaft position detector 22.

In Step S4, the position compensation of the output shaft 37 calculated in Step S2 and the torque compensation $\tau_M$ of the drive shaft 36 calculated in Step S3 are added together, whereby the command value is calculated. Based on the calculated command value, the drive source 21 drives the drive shaft 36.

In Step S5, it is confirmed whether or not the control is ended, and if the control is not ended, then the processing returns to Step S1, where the command value is calculated.

Next, a description will be made of a method of calculating the position compensation of the output shaft 37 in Step S2 of FIG. 4 while referring to a flowchart of FIG. 5.

In Step S11, the output shaft position detector 23 detects the displacement $\Theta_J$ of the position of the output shaft 37, and the output shaft position input unit 102 inputs the detected displacement $\Theta_J$ to the CPU 1.

In Step S12, the second deviation calculation unit 13 calculates the first deviation $\Delta\Theta_J$ between the displacement $\Theta_J$ of the position of the output shaft 37 and the target position $\Theta_{Jr}$.

In Step S13, the second deviation calculation unit 13 converts the first deviation $\Delta\Theta_J$ by using the interference matrix $^M T_J$, thereby calculating the second deviation $\Delta\Theta_M$.

In Step S14, the drive shaft position detector 22 detects the displacement $\Theta_M$ of the position of the drive shaft 36, and the drive shaft position input unit 101 inputs the detected displacement $\Theta_M$ to the CPU 1.

In Step S15, the speed calculation unit 16 calculates the speed of the drive shaft 36 based on the displacement $\Theta_M$ of the position of the drive shaft 36, which is detected by the drive shaft position detector 22.

In Step S16, the position compensation calculation unit 14 calculates the position compensation of the drive shaft 36 based on the second deviation $\Delta\Theta_M$, and defines the calculated position compensation of the drive shaft 36 as the position compensation of the output shaft 37.

Figure 6:
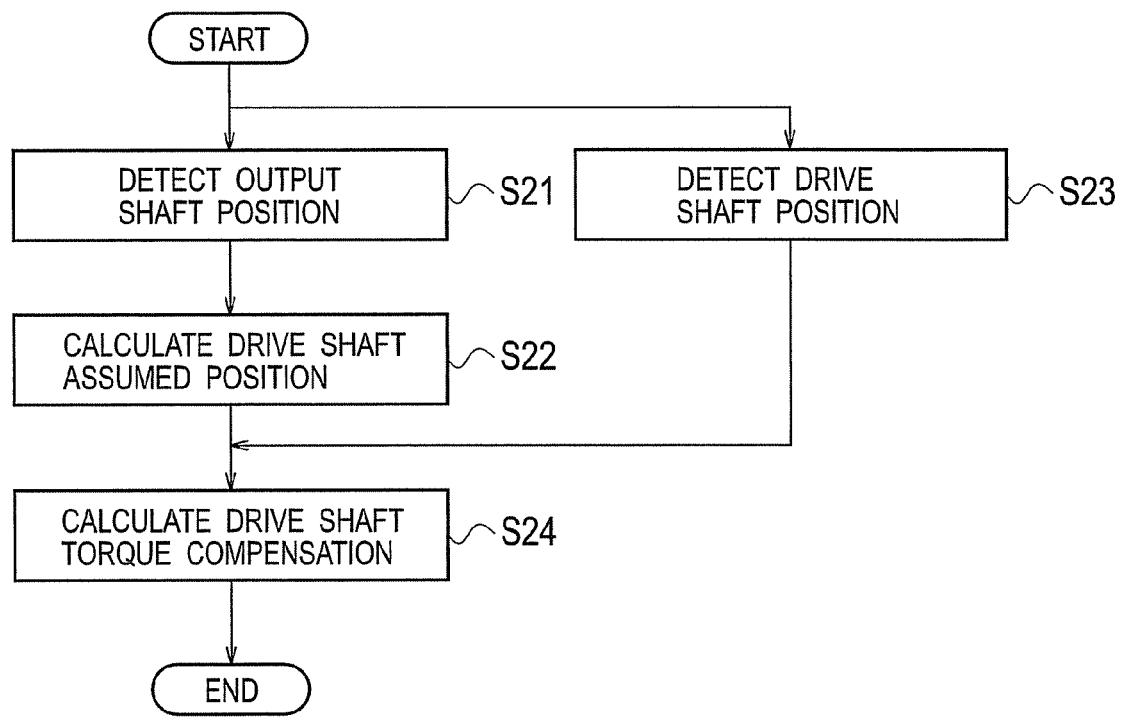
FIG. 6 is a flowchart for explaining an example of a method for calculating torque compensation according to the embodiment of the present invention.

Next, a description will be made of a method of calculating the torque compensation of the drive shaft 36 in Step S3 of FIG. 4 while referring to a flowchart of FIG. 6.

In Step S21, the output shaft position detector 23 detects the displacement $\Theta_J$ of the position of the output shaft 37.

In Step S22, the assumed position calculation unit 18 reads out the interference matrix $^M T_J$ of the reference posture from the interference matrix memory 4, and converts the displacement $\Theta_J$ of the position of the output shaft 37, which is detected by the output shaft position detector 23, by means of Expression (1) using the interference matrix $^M T_J$ of the reference posture, thereby calculating the assumed position $\Theta'_M$ of drive shaft 36.

In Step S23, the drive shaft position detector 22 detects the displacement $\Theta_M$ of the position of the drive shaft 36.

In Step S24, the torque compensation calculation unit 19 calculates the difference $\Delta\Theta_M$ between the assumed position $\Theta'_M$ of the drive shaft 36 and the displacement $\Theta_M$ of the position of the drive shaft 36, the difference $\Delta\Theta_M$ corresponding to the variation $\Delta^M T_J$ of the interference matrix.

In Step S25, the torque compensation calculation unit 19 calculates the torque compensation $\tau_M$ of the drive shaft 36 based on the difference $\Delta\Theta_M$.

In accordance with the control apparatus according to the embodiment of the present invention, in a control subject including nonlinear elements such as the drive force transmitting tool (wire/belt) 38, the interference matrix is not regarded as constant, but the torque compensation of the drive shaft 36 is calculated in consideration of the variation $\Delta^M T_J$ of the interference matrix, which is caused by response to the posture change of the control subject, such as the change of the positions of the links 31 and 32 shown in FIG. 2, and to the load applied to the control subject Accordingly, a stabilized control is enabled.

Moreover, since tension of the drive force transmitting tool (wire) 38 does not have to be directly measured, rigidity of the drive force transmitting tool (wire) 38 can be maintained.

Figure 4:
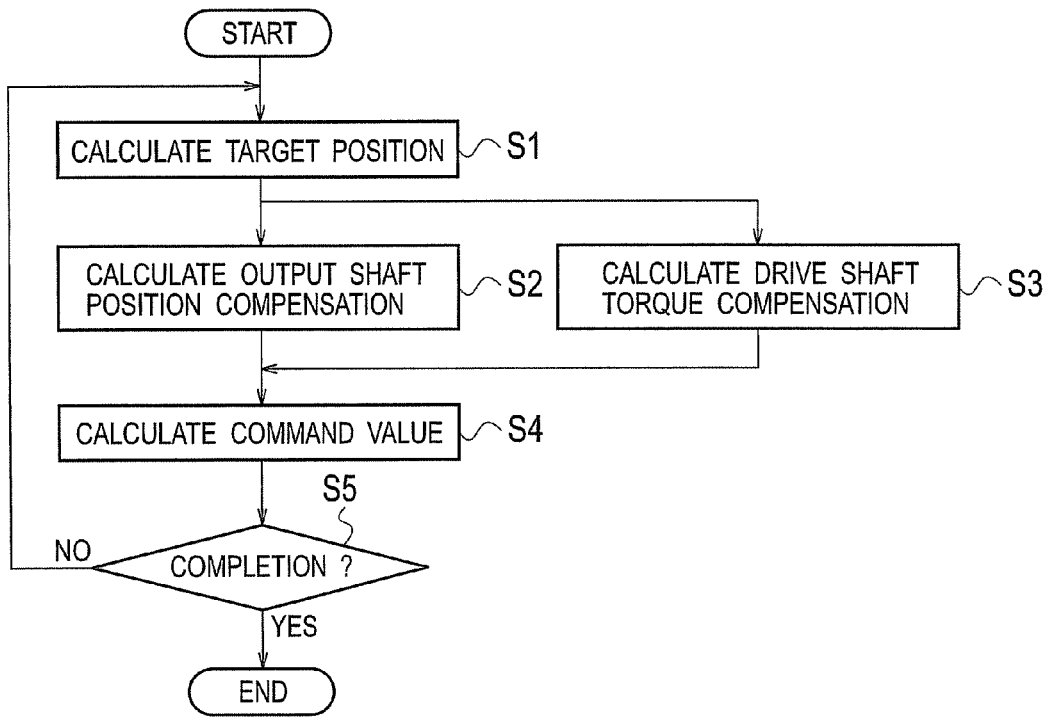
FIG. 4 is a flowchart for explaining an example of a control method according to the embodiment of the present invention.

The procedures shown in FIG. 4 can be executed by the control apparatus shown in FIG. 1 by a program, in which the algorisms thereof correspond to the described procedures. The program includes: instructions for detecting the displacement $\Theta_M$ of the position of the drive shaft 36; instructions for detecting displacement $\Theta_J$ of the position of the output shaft 37; instructions for calculating the target position of the output shaft 37; instructions for calculating the position compensation for the drive shaft 36 using the data regarding an interference matrix $^M T_J$ based on the target position and the detected/inputted position of the output shaft 37; instructions for calculating the torque compensation $\tau_M$ for the drive shaft 36 using the data regarding the interference matrix $^M T_J$ based on the detected/inputted displacement $\Theta_J$ of the output shaft 37 and the detected/inputted displacement $\Theta_M$ of the drive shaft 36; instructions for calculating the command value to the drive source 21 for the drive shaft 36 based on the torque compensation $\tau_M$; and instructions for outputting the signal for driving the drive shaft 36 from the output unit 103 to the drive source 21 based on the command value.

The program may be stored in the data memory 3 and the like of the control apparatus shown in FIG. 1. The program can be stored in a computer-readable storage medium. The procedures of the method according to the embodiment of the present invention can be performed by reading the program from the computer-readable storage medium to the data memory 3.

Here, the "computer-readable storage medium" means any media and the like that can store a program, including, e.g., external memory units, semiconductor memories, magnetic disks, optical disks, magneto-optical disks, magnetic tape, and the like for a computer.

To be more specific, the "computer-readable storage media" include flexible disks, CD-ROMs, MO disks, cassette tape, open reel tape, and the like. For example, the main body of the mask data generation system can be configured to incorporate a flexible disk drive and an optical disk drive, or to be externally connected thereto. A flexible disk is inserted into the flexible disk drive from a slot, a CD-ROM is inserted into the optical disk drive from a slot, and then a given readout operation is executed, whereby programs stored in these storage media can be installed on the data memory 3. In addition, by connecting given drives to the mask data generation system, it is also possible to use, for example, a ROM as a memory unit employed for a game pack or the like, and cassette tape as magnetic tape. Furthermore, it is possible to store a program in another program storage device via an information processing network, such as the Internet.

(First Modification)

Figure 7:
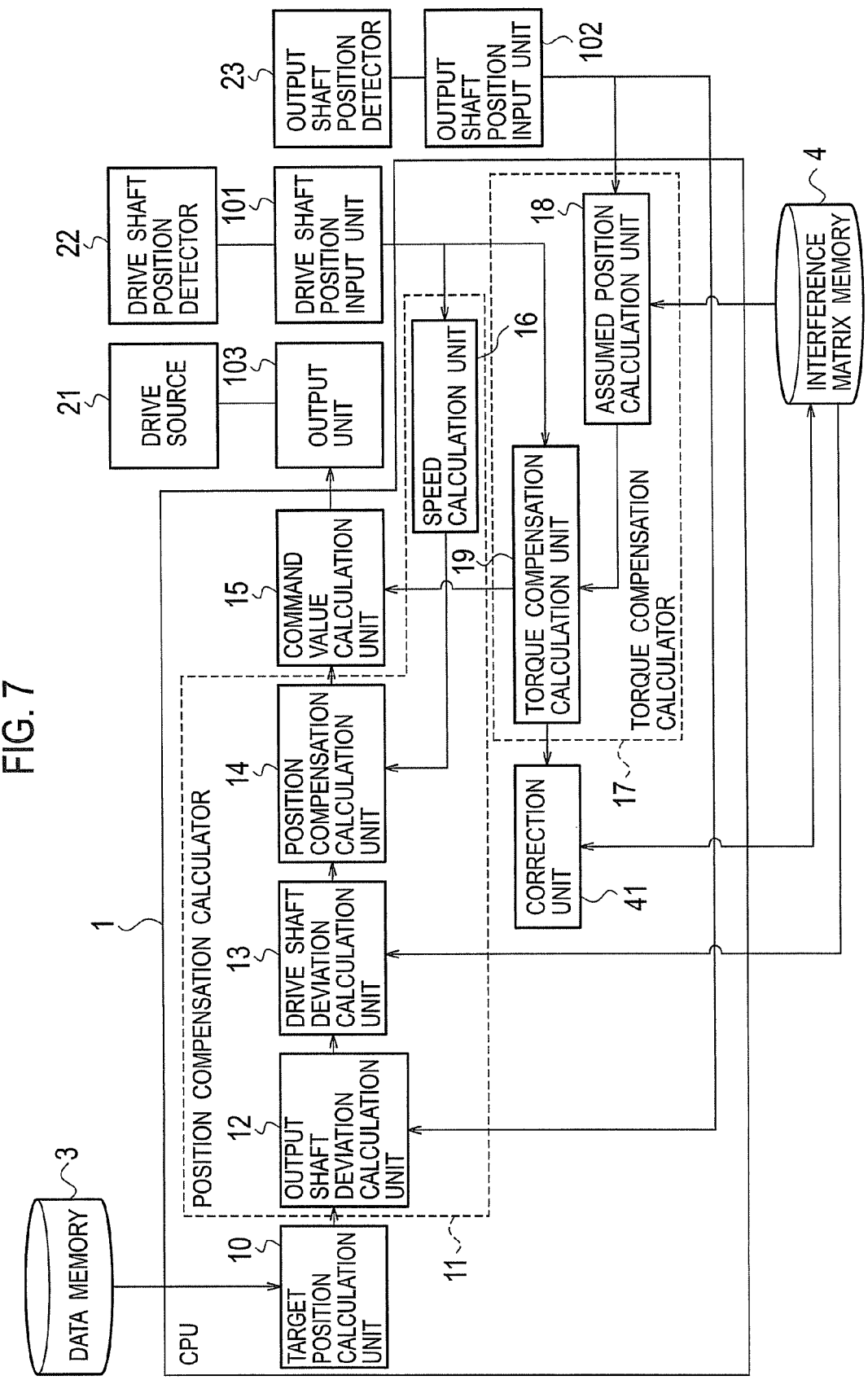
FIG. 7 is a block diagram showing an example of a control apparatus according to a first modification.

As a first modification, a description will be given of correcting the interference matrix $^M T_J$ stored in the interference matrix memory 4. In terms of a configuration, as shown in FIG. 7, a control apparatus according to the first modification is different from the control apparatus shown in FIG. 1 as further including a correction unit 41.

The correction unit 41 corrects the interference matrix $^M T_J$ by using the variation $\Delta^M T_J$ of the interference matrix, which is calculated by the torque compensation calculation unit 19. The variation $\Delta^M T_J$ of the interference matrix depends on the difference $\Delta \Theta_M$ between the assumed position $\Theta'_M$ of the drive shaft 36 and the displacement $\Theta_M$ of the position of the drive shaft 36. Accordingly, as in Expression (7), a time difference (temporal differentiation) $\Delta \Theta_M(t_n)/dt$ of the difference $\Delta \Theta_M$ is calculated.

$$\Delta \Theta_M(t_n)/dt = (\Theta'_M(t_n) - \Theta_M(t_n)) - (\Theta'_M(t_{n-1}) - \Theta_M(t_{n-1})) \quad (7)$$

Here, in consideration of a product with a position vector of the output shaft 37, the interference matrix $^M T_J$ is expressed as in Expression (8), and a row vector $T_{Mi}$ is corrected by a component $\Delta \Theta_{Mi}$ of the difference $\Delta \Theta$.

$$^M T_J = [T_{M1}, T_{M2}, \ldots T_{Mm}]^t \quad (8)$$

For example, where the difference $\Delta \Theta$ is subjected to linear compensation, the row vector $T_{Mi}$ of the interference matrix $^M T_J$ is corrected as in Expression (9) by using $\Delta \Theta_M(t_n)/dt$ and using $K_{Ti}$ as a coefficient, and a new interference matrix is obtained.

$$T_{Mi} = T_{Mi} + K_{Ti} \Delta \Theta_{Mi}(t_n) \quad (9)$$

Note that, as $\Delta \Theta_M(t_n)/dt$ is larger, the amount of correction is increased, leading to an increased possibility that the control may become unstable. Accordingly, processing may be performed in which a threshold value for $\Delta \Theta_M(t_n)/dt$ is stored in advance in the data memory 3, and the correction unit 41 compares $\Delta \Theta_M(t_n)/dt$ with the threshold value, and performs a correction, such as rounding, in the case where $\Delta \Theta_M(t_n)/dt$ is larger than the threshold value.

Next, a description will be made of a control method according to the first modification while referring to a flowchart of FIG. 8.

In Step S31, the target position calculation unit 10 calculates the target position $\Theta_{Jr}$.

In Step S32, the correction unit 41 determines whether or not to correct the interference matrix $^M T_J$ based on an elapsed time from the previous correction, and the like. In the case where the correction unit 41 has determined to correct the interference matrix $^M T_J$, processing proceeds to Step S33.

In Step S33, the correction unit 41 calculates $\Delta \Theta_M(t_n)/dt$, and corrects the elements of the interference matrix $^M T_J$ by using $\Delta \Theta_M(t_n)/dt$.

In parallel to Step S33, in Step S34, the position compensation of the output shaft 37 is calculated by using the corrected interference matrix $^M T_J$ based on the displacement $\Theta_J$ of the position of the output shaft 37, which is detected by the output shaft position detector 23, and on the target position $\Theta_{Jr}$ calculated by the target position calculation unit 10.

In Step S35, the torque compensation $\tau_M$ of the drive shaft 36 is calculated by using the corrected interference matrix $^M T'_J$ based on the displacement $\Theta_J$ of the position of the output shaft 37, which is detected by the output shaft position detector 23, and on the displacement $\Theta_M$ of the position of the drive shaft 36, which is detected by the drive shaft position detector 22.

Procedures in Steps S36 and S37 are substantially similar to procedures in Steps S4 and S5 of FIG. 4. Accordingly, a duplicate description will be omitted.

Next, a description will be made of a method of correcting the interference matrix in Step S33 of FIG. 8 while referring to a flowchart of FIG. 9.

In Step S41, the output shaft position detector 23 detects the displacement $\Theta_J$ of the position of the output shaft 37.

In Step S42, the assumed position calculation unit 18 reads out the interference matrix $^M T_J$ of the reference posture from the interference matrix memory 4, and converts the displacement $\Theta_J$ of the position of the output shaft 37, which is detected by the output shaft position detector 23, by using the interference matrix $^M T_J$ of the reference posture, thereby calculating the assumed position $\Theta'_M$ of the drive shaft 36.

In Step S43, the drive shaft position detector 22 detects the displacement $\Theta_M$ of the position of the drive shaft 36.

In Step S44, the torque compensation calculation unit 19 calculates the difference $\Delta \Theta_M$ between the assumed position $\Theta'_M$ of the drive shaft 36 and the displacement $\Theta_M$ of the position of the drive shaft 36.

In Step S45, the correction unit 41 calculates the time difference $\Delta \Theta_M(t_n)/dt$, and defines the calculated time difference $\Delta \Theta_M(t_n)/dt$ as the correction amount of the interference matrix.

In Step S46, by using $\Delta \Theta_M(t_n)$, the correction unit 41 corrects the elements of the interference matrix j stored in the interference matrix memory 4.

In accordance with the first modification, the elements of the interference matrix $^M T_J$ are corrected, whereby the drive force transmitting tool 38 can be expressed more accurately. As a result, the assumed position $\Theta'_M$ of the drive shaft 36 can be calculated more accurately, and the second deviation $\Delta \Theta_M$ can be reduced. As a result, the torque compensation $\tau_M$ of the drive shaft 36 can also be reduced.

Figure 8:
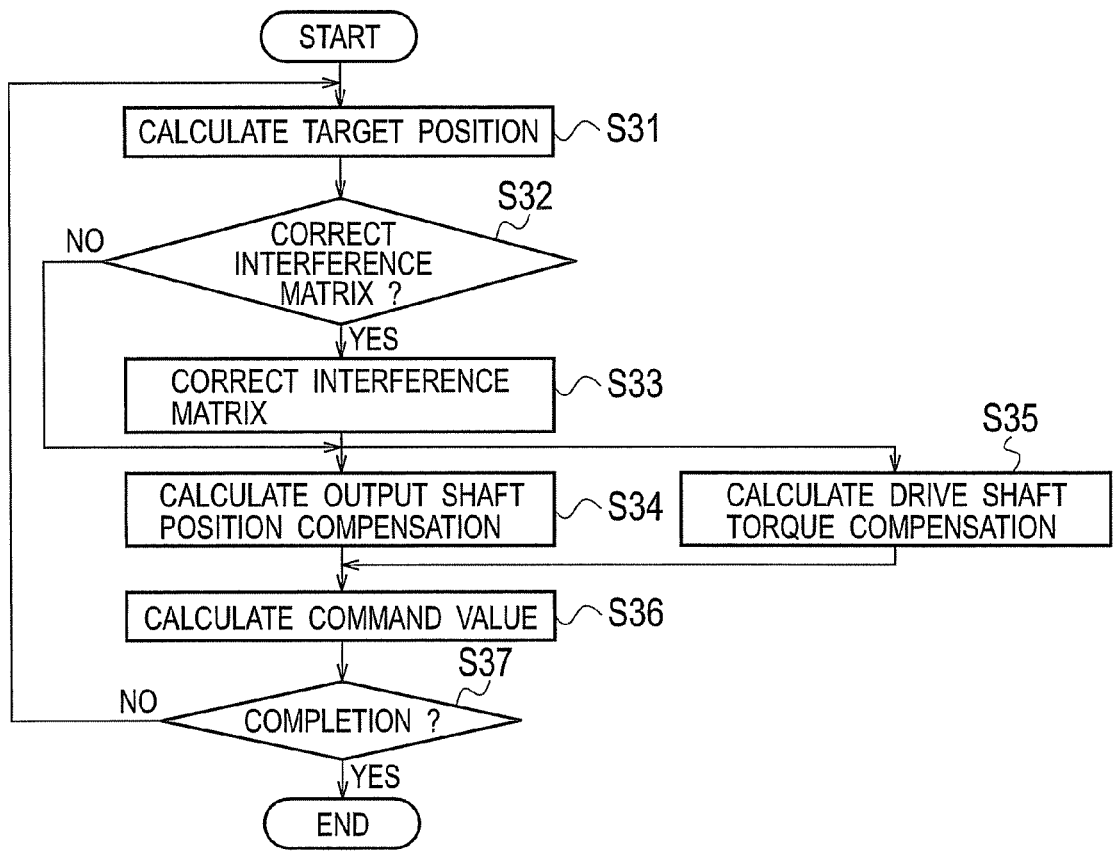
FIG. 8 is a flowchart for explaining an example of a control method according to the first modification.
Figure 9:
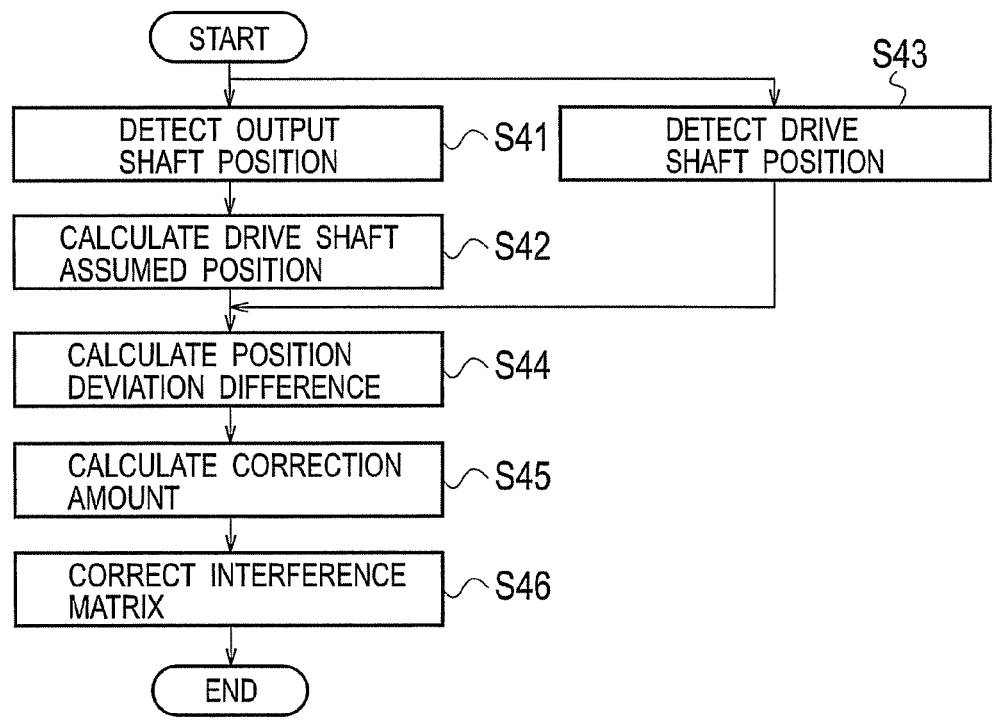
FIG. 9 is a flowchart for explaining an example of a method for correcting an interference matrix according to the first modification.

Moreover, in Step S32 shown in FIG. 8, the correction unit 41 determines a certain constant interval for correction, thus making it possible to adjust a frequency to make the correction. Here, if the correction of the interference matrix $^M T_J$ is made at a frequency substantially similar to the control cycle, then there is a possibility that vibrations may be induced in the position compensation of the output shaft 37. Hence, if a cycle for correcting the interference matrix $^M T_J$ is as long as several times the cycle for calculating the target position $\Theta_{Jr}$, then control stability can be ensured.

(Second Modification)

Figure 5:
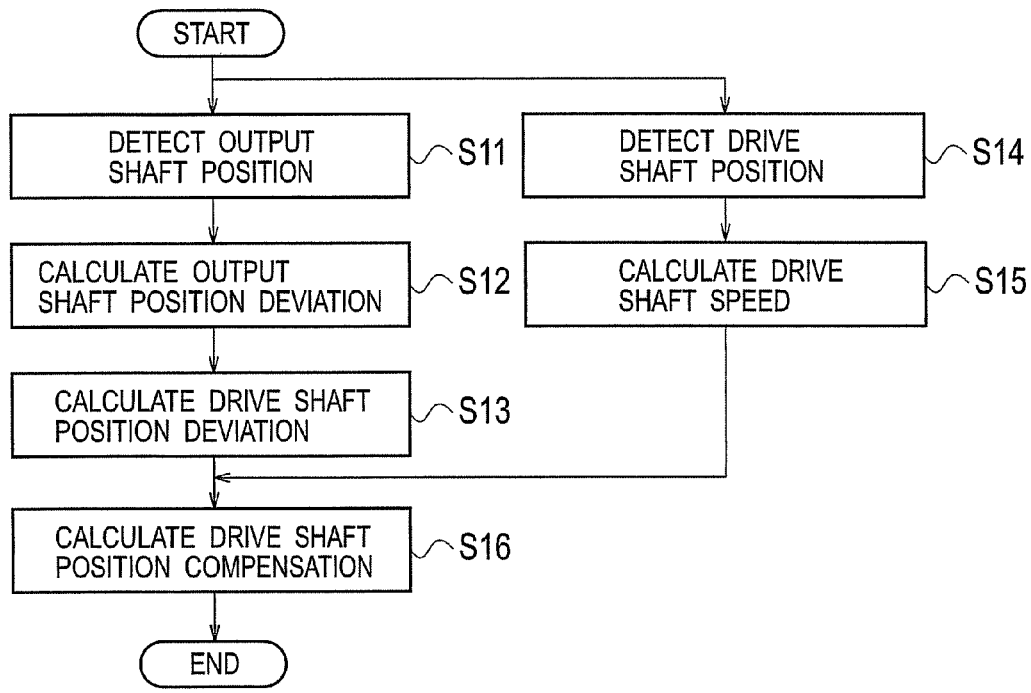
FIG. 5 is a flowchart for explaining an example of a method for calculating position compensation for an output shaft according to the embodiment of the present invention.
Figure 10:
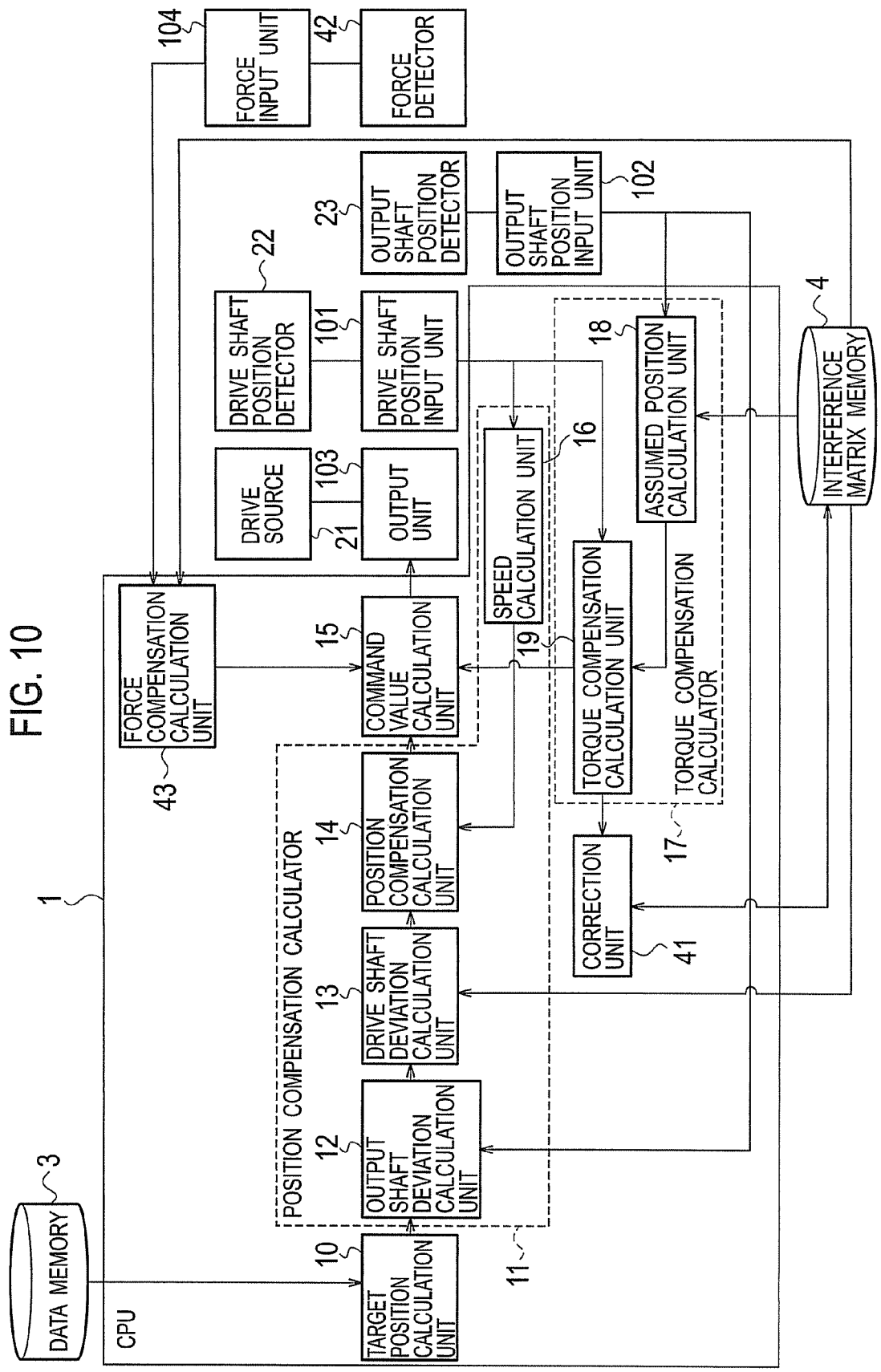
FIG. 10 is a block diagram showing an example of a control apparatus according to a second modification.

As shown in FIG. 10, a second modification is different from the first modification shown in FIG. 5 as further including: a force detector (force sensor) 42; and a force compensation calculation unit 43.

For example, the force detector 42 is attached to a tip end portion of the control subject (robot) with the force input unit 104 interposed therebetween. The force detector 42 detects the load applied to the output shaft 37. The force detector 42, should be capable of measuring six-axis force/moment may be used.

By using the Jacobian J, the force compensation calculation unit 43 calculates the output shaft torque $\tau_J$ as in Expression (10) based on the applied load F detected by the force detector 42.

$$\tau_J = J^t F \quad (10)$$

Based on the principle of virtual work, the force compensation calculation unit 43 converts the output shaft torque $\tau_J$ into the drive shaft torque $\tau_M$ applied to each drive shaft 36 as in Expression (11) by using a drive shaft-output shaft position conversion interference matrix $^J T_M$ as an inverse matrix of $^M T_J$.

$$\tau_M = (^M T_J)^{-1} \tau_J = {}^J T_M \tau_J \quad (11)$$

The force compensation calculation unit 43 calculates force compensation, such as linear compensation, by using the drive shaft torque $\tau_M$. The command value calculation unit 15 adds the force compensation, which is calculated by the force compensation calculation unit 43, to the position compensation of the output shaft 37 and the torque compensation of the drive shaft 36, thereby calculating the command value. Other configurations are substantially similar to those of the control apparatus shown in FIG. 7, and accordingly, a duplicate description will be omitted.

Figure 11:
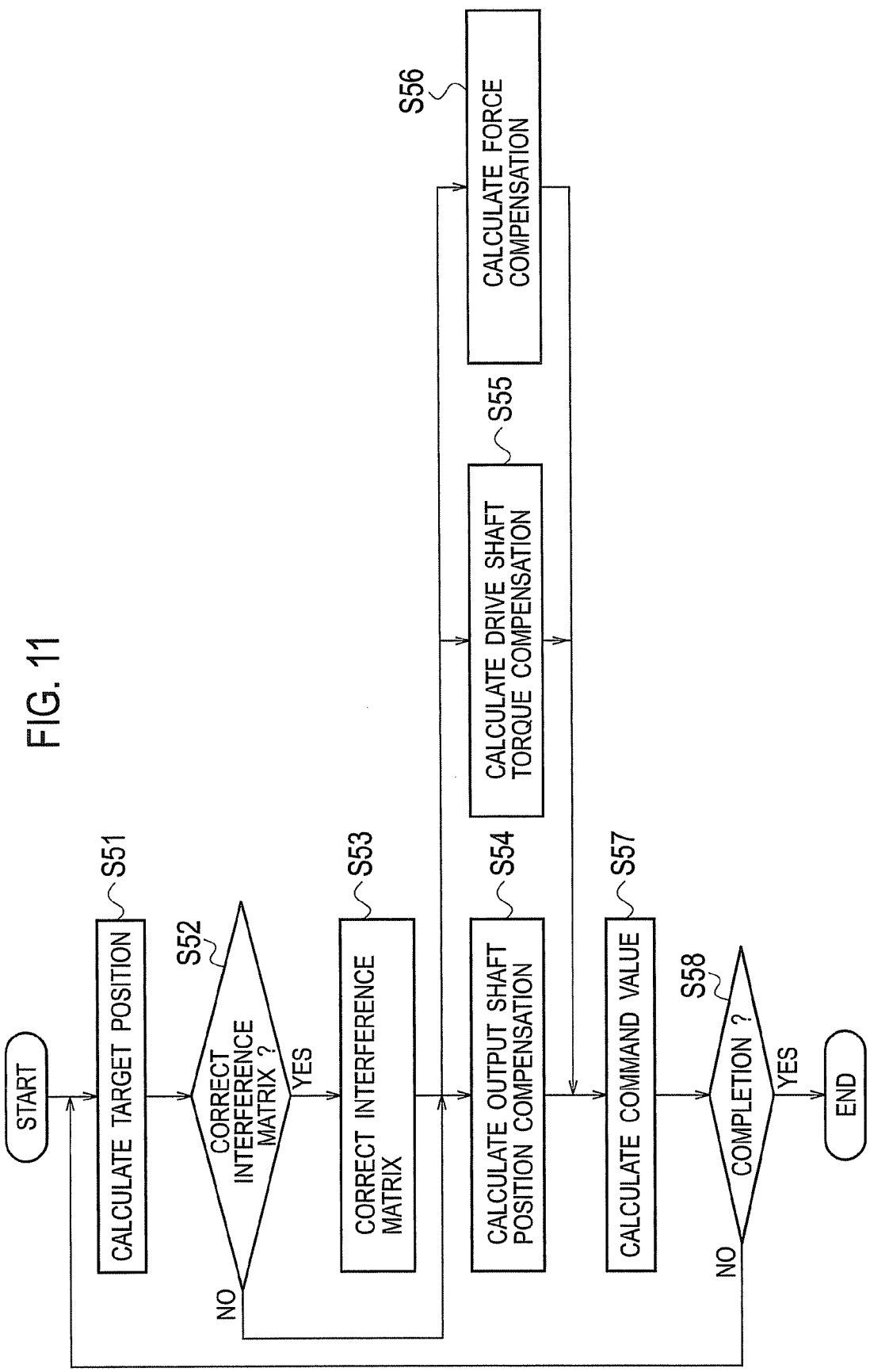
FIG. 11 is a flowchart for explaining an example of a control method according to the second modification.

Next, a description will be made of a control method according to the second modification with reference to a flowchart of FIG. 11.

In Step S51, the target position calculation unit 10 calculates the target position $\theta_{Jr}$.

In Step S52, the correction unit 41 determines whether or not to correct the interference matrix $^M T_J$ based on the elapsed time from the previous correction, and the like. When the correction unit 41 determines that the interference matrix $^M J_J$ should be corrected, processing in this method proceeds to Step S53.

In Step S53, the correction unit 41 calculates $\Delta\Theta_M(t_n)$, and corrects the elements of the interference matrix $^M T_J$ by using $\Delta\Theta_M(t_n)$.

In Step S54, the position compensation of the output shaft 37 is calculated, and in Step S55, the torque compensation of the drive shaft 36 is calculated. Moreover, in parallel to Steps S54 and S55, in Step S56, the force compensation calculation unit 43 calculates the force compensation.

In Step S57, the command value calculation unit 15 calculates the command value based on the position compensation of the output shaft 37, the torque compensation of the drive shaft 36 and the force compensation. Based on the calculated command value, the drive source 21 controls the drive shaft 36.

Figure 12:
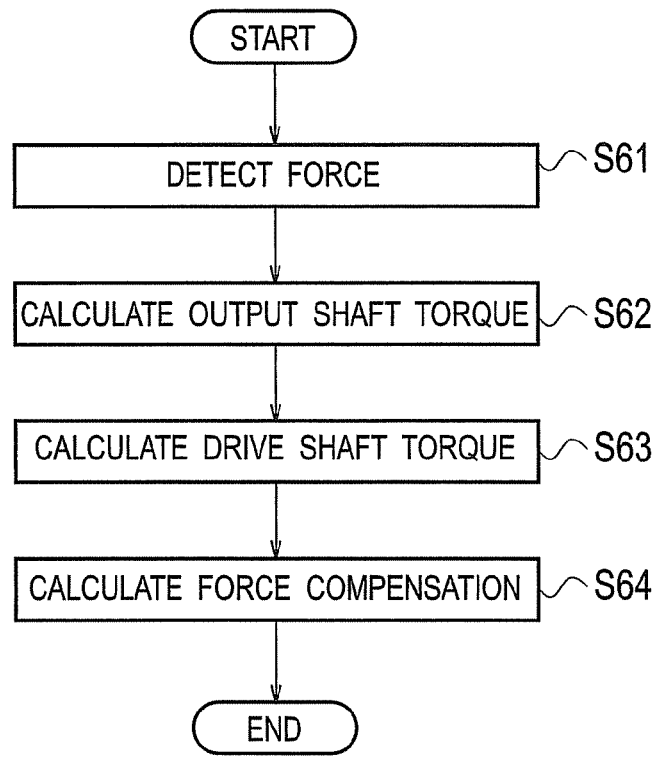
FIG. 12 is a flowchart for explaining an example of a method for calculating force compensation according to the second modification.

Next, a description will be made of a method of calculating the force compensation in Step S56 of FIG. 11 while referring to a flowchart of FIG. 12.

In Step S61, the force detector 42 detects the load (force) applied to the output shaft 37.

In Step S62, the force compensation calculation unit 43 calculates the output shaft torque $\tau_J$ based on the applied load detected by the force detector 42.

In Step S63, the force compensation calculation unit 43 converts the output shaft torque $\tau_J$ by using the interference matrix, and calculates the drive shaft torque $\tau_M$.

In Step S64, the force compensation calculation unit 43 calculates the force compensation by using the drive shaft torque $\tau_M$.

Figure 13:
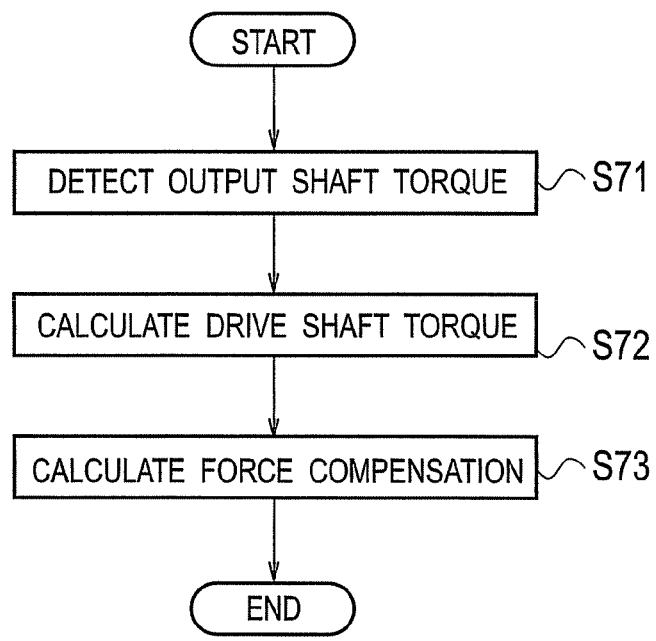
FIG. 13 is a flowchart for explaining an example of a method for calculating torque compensation according to the second modification.

In place of the force detector 42 shown in FIG. 10, an output shaft torque detector (torque sensor) that detects the torque of the output shaft 37 may be provided. A force compensation calculation method in this case will be described while referring to a flowchart of FIG. 13.

In Step S71, the output shaft torque detector detects the output shaft torque. In this case, the same physical quantity as in the output shaft torque $T_J$ calculated by the force compensation calculation unit 43 in Step S62 of FIG. 11 is obtained.

In Step S72, the force compensation calculation unit 43 converts the output shaft torque, which is detected by the output shaft torque detector, by using the interference matrix, thereby calculating the drive shaft torque $\tau_M$.

In Step S73, the force compensation calculation unit 43 calculates the force compensation by using the drive shaft torque $\tau_M$.

In accordance with the second modification, the torque acting on the drive shaft 36 is calculated by the force detector 42 that measures the load applied to the tip end portion of the robot and by the torque detector that measures the external torque acting on each joint input. Then, the calculated torque acting on the drive shaft 36 is added as the force compensation or the torque compensation to the command value, thus making it possible to calculate a more accurate command value.

Other Embodiment

In the description of the embodiment, as a power transmission system of the robot, such a system shown in FIG. 2, has been described and comprises a pair of the drive pulley 33 and the driven pulley 34 and the drive force transmitting tool (wire) 38. However, other power transmission systems may be used. Moreover, the power transmission system may include an element such an interference mechanism that does not have one-to-one correspondence with the drive shaft 36 and the output shaft 37.

Moreover, in the control apparatus, the CPU 1 may be integrated with the control subject (robot) by being embedded therein. Furthermore, it is also possible to locate the CPU 1 outside of the control subject, and for the CPU 1 to perform a wired or wireless remote control.

Various modifications will become possible for those skilled in the art after receiving the teachings of the present disclosure without departing from the scope thereof.

What is claimed is:

1. A control apparatus for controlling a control subject comprising a drive shaft, an output shaft, a drive source for driving the drive shaft, and a drive force transmitting tool for transmitting a drive force from the drive shaft to the output shaft, comprising:
   a memory configured to store data regarding an interference matrix representing a relationship between a position of the output shaft and a position of the drive shaft;
   a position compensation calculator configured to calculate position compensation for the drive shaft by using the data based on a target position of the output shaft and a detected position of the output shaft;
   a torque compensation calculator configured to calculate torque compensation for the drive shaft by using the data based on the detected position of the output shaft and a detected position of the drive shaft;
   a command value calculation unit configured to calculate a command value based on the position compensation and the torque compensation; and
   an output unit configured to output a signal to the drive source based on the command value.

2. The control apparatus of claim 1, wherein the position compensation calculator comprises:
   a first deviation calculation unit configured to calculate a first deviation between the target position and the detected position of the output shaft; a second deviation calculation unit configured to calculate a second deviation using the data based on the first deviation;

a speed calculation unit configured to calculate a speed of the drive shaft based on the detected position of the drive shaft; and a position compensation calculation unit configured to calculate the position compensation based on the second deviation and the speed.

3. The control apparatus of claim 1, wherein the torque compensation calculator comprises:

an assumed position calculation unit configured to calculate an assumed position of the drive shaft by converting the detected position of the output shaft by using the data; and a torque compensation calculation unit configured to calculate the torque compensation based on a difference between the assumed position and the detected position of the drive shaft.

4. The control apparatus of claim 3, further comprising a correction unit configured to correct the data based on the difference.

5. The control apparatus of claim 4, wherein the correction unit calculates a temporal differentiation of the difference, and corrects the data based on the time difference.

6. The control apparatus of claim 3, further comprising a target position calculation unit configured to calculate the target position, and the correction unit corrects the data the target position in a cycle longer than a cycle for calculating the target position.

7. The control apparatus of claim 1, further comprising a force compensation calculation unit configured to calculate force compensation based on a force applied to the output shaft.

8. The control apparatus of claim 7, wherein the command value calculation unit calculates the command value based on the position compensation, the torque compensation and the force compensation.

9. The control apparatus of claim 1, further comprising a force compensation calculation unit configured to calculate force compensation using the data based on a torque applied to the output shaft.

10. A method for controlling a control subject comprising a drive shaft, a output shaft, a drive source for driving the drive shaft, and a drive force transmitting tool for transmitting a drive force from the drive shaft to the output shaft, comprising:

calculating position compensation for the drive shaft using data regarding an interference matrix representing a relationship between a position of the output shaft and a position of the drive shaft, based on a target position of the output shaft and a detected position of the output shaft;

calculating a torque compensation for the drive shaft using the data based on the detected position of the output shaft and a detected position of the drive shaft;

calculating a command value based on the position compensation and the torque compensation; and outputting a signal to the drive source based on the command value.

11. The method of claim 10, wherein calculating the position compensation comprises:

calculating a first deviation between the target position and the detected position of the output shaft;

calculating second deviation using the data based on the deviation;

calculating a speed of the drive shaft based on the detected position of the drive shaft; and calculating the position compensation based on the second deviation and the speed.

12. The method of claim 10, wherein calculating the torque compensation comprises:

calculating an assumed position of the drive shaft by converting the detected position of the output shaft using the data; and calculating the torque compensation based on a difference between the assumed position and the detected position of the drive shaft.

13. The method of claim 12, further comprising correcting the data based on the difference.

14. The method of claim 13, wherein correcting the data comprises:

calculating a time difference of the difference; and correcting the data based on the time difference.

15. The method of claim 14, further comprising calculating the target position, and the correcting of the data comprises correcting the data of the target position in a cycle longer than a cycle for calculating the target position.

16. The method of claim 10, further comprising calculating force compensation based on a force applied to the output shaft.

17. The method of claim 16, wherein calculating the command value comprises calculating the command value based on the force compensation.

18. The method of claim 10, further comprising calculating force compensation using the data based on a torque applied to the output shaft.

19. A robot comprising:

a drive shaft;

an output shaft;

a drive source configured to drive the drive shaft; and a drive force transmitting tool configured to transmit a drive force from the drive shaft to the output shaft;

a drive shaft position detector configured to detect a position of the drive shaft; an output shaft position detector configured to detect a position of the output shaft;

a control apparatus comprising:

a memory configured to store data regarding an interference matrix representing a relationship between a position of the output shaft and a position of the drive shaft;

a position compensation calculator configured to calculate position compensation for the drive shaft by using the data based on a target position of the output shaft and a detected position of the output shaft;

a torque compensation calculator configured to calculate torque compensation for the drive shaft by using the data based on the detected position of the output shaft and a detected position of the drive shaft;

a command value calculation unit configured to calculate a command value based on the position compensation and the torque compensation; and an output unit configured to output a signal based on the command value; and, a drive source configured to drive the drive shaft based on the signal.

* * * * *